United States Patent
Aldalbahi et al.

(10) Patent No.: US 11,956,673 B1
(45) Date of Patent: Apr. 9, 2024

(54) CACHING METHOD FOR F-RAN BASED COMMUNICATIONS

(71) Applicant: KING FAISAL UNIVERSITY, Al-Ahsa (SA)

(72) Inventors: Adel Aldalbahi, Al-Ahsa (SA); Mohammed A. Jasim, Tacoma, WA (US); Nazli Siasi, Chicago, IL (US)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/083,462

(22) Filed: Dec. 16, 2022

(51) Int. Cl.
*H04W 28/086* (2023.01)

(52) U.S. Cl.
CPC .............................. *H04W 28/0864* (2023.05)

(58) Field of Classification Search
None
See application file for complete search history.

(56) References Cited

U.S. PATENT DOCUMENTS

| | | | |
|---|---|---|---|
| 11,096,225 B2 | 8/2021 | Kuo et al. | |
| 11,201,784 B2 | 12/2021 | Peng et al. | |
| 2017/0366472 A1* | 12/2017 | Byers | H04L 67/289 |
| 2022/0166848 A1* | 5/2022 | Banerjee | H04L 67/535 |

FOREIGN PATENT DOCUMENTS

| | | |
|---|---|---|
| CN | 111314349 B | 11/2021 |
| WO | WO2022212079 * | 3/2022 |

OTHER PUBLICATIONS

Cui et al., "Graph-based cooperative caching in Fog-RAN", 2018 International Conference on Computing, Networking and Communications (ICNC) IEEE (2018).
Siasi et al., "Delay-aware SEC provisioning in hybrid fog-cloud computing architectures", IEEE Access 8 (2020), 167383=167396.
Siasi et al., Deep learning for service function chain provisioning in fog computing:, IEEE Access 8 (2020), 167665-167683.
Hu et al., "Simultaneous wireless content and power transfer in F-RAN Caching, eRRH classification and beamforming", IEEE Transactions on Vehicular Technology 69.11(2020). 12992-13004.
Aldalbahi, "Link Recovery Scheme for Multi-Point mmWave Communications", Electronics 9.1 (2019), 50.
Aldalbahi et al., "Clustered and Distributed Caching Methods for F-RAN-Based mmWave Communications", Applied Sciences 12.14 (2022), 7111.

* cited by examiner

*Primary Examiner* — Mohammad S Adhami
(74) *Attorney, Agent, or Firm* — Nath, Goldberg & Meyer; Richard C. Litman

(57) ABSTRACT

The caching method for F-RAN based communications in a mmWave communication system includes receiving a request for a network function generated from a requesting mobile station at a layer-two fog node closest to the requesting mobile station. In a clustered caching method, the network functions a cached on a layer-three cluster fog node servicing a cluster or layer two fog nodes. In a distributed caching method, a single, unique network function is cached on each of the layer-two fog nodes in the cluster, which are serially polled until the requested network function. The requested network function is executed at the layer-two or layer three fog node having the network function cached thereon in order to reduce fronthaul communications with layer four cloud nodes for greater efficiency.

4 Claims, 4 Drawing Sheets

CACHING METHOD FOR F-RAN BASED COMMUNICATIONS

BACKGROUND

1. Field

The disclosure of the present patent application relates to millimeter wave communication systems, and particularly to a caching method for F-RAN (Fog-Radio Access Network) based communications.

2. Description of the Related Art

Millimeter wave (mmWave) bands support wide bandwidth transmission without the need for sophisticated channelization techniques, such as multi-carrier and career aggregation. This is attributed to the wide contiguous bandwidth chunks at these bands. This has allowed for mmWave to be considered in the New Radio (NR) standard of the 5G standard, in the Frequency Range (FR) 2. A key limitation in mmWave bands here is the high path and penetration losses, along with atmospheric attenuation, oxygen absorption, and sensitivity to blockage. This makes mmWave links susceptible to significant degradation in signal quality.

The long separation distances between mobile station (MS) terminals and access points (radio remote heads) adds complexity to the design of beamforming and access networks. For beamforming, new designs are required that deem low power consumption and multi-analog beamformers at the MS terminals and digital or hybrid beamformers at the BS (base station) for spatial multiplexing and multi-user connectivity. For access networks, it is essential to reduce fronthaul traffic to minimize end-to-end delays for the geographically distributed terminals. Thus, a caching method for F-RAN based communications solving the aforementioned problems is desired.

SUMMARY

Fog-radio access networks (F-RANs) alleviate fronthaul delays for cellular networks, as compared to their cloud counterparts. This allows them to be suitable solutions for networks that demand low propagation delays. Namely, they are suitable for millimeter wave (mmWave) operations that suffer from short propagation distances and possess a poor scattering environment (low channel ranks). The F-RAN includes fog nodes that are collocated with radio remote heads (RRHs) to provide local processing capabilities for mobile station (MS) terminals. These terminals demand various network functions (NFs) that correspond to different service requests. Now, provisioning these NFs on the fog nodes also yields service delays due to the requirement for service migration from the cloud, i.e., offloading to the fog nodes. One solution to reduce this service delay is to provide cached copies of popular NFs in advance. Hence, it is critical to study function popularity and allow for content caching at the F-RAN. This is further a necessity given the limited resources at the fog nodes, thus requiring efficient resource management to enhance network capacity at reduced power and cost penalty. The caching method for F-RAN (Fog-Radio Access Network) based communications includes allocating popular NFs on the fog nodes to accelerate services for the terminals, namely, using clustered and distributed caching methods.

The node allocation procedure finds an optimal fog node that hosts the popular network functions (NFs) requested by the subscribers. Each of the caching methods (clustered and distributed) maps the content efficiently on the nodes. The methods achieve efficient network operations and improve subscribers' quality-of experience (QoE), at reduced service delay, energy consumption, and cost reduction in network infrastructure, without reducing network capacity. Fronthaul delays are reduced by caching popular NFs onto the fog nodes without offloading to the cloud, which is beneficial for mmWave operations. Hence, content is not offloaded to the cloud, despite the limited available resources at the fog nodes, along with the demand of high computation and low latency from users. The caching placement forbids online offloading to the cloud core to avoid exceeding the delay bounds of the users.

One embodiment is a caching method in a F-RAN based mmWave communication system using multiple layers. The method includes receiving a request for a network function generated from a requesting mobile station at a layer-two fog node closest to the requesting mobile station, and sending the request for a network function from the layer-two fog node to a layer-three fog node. If the requested network function is not supported at the layer-three fog node, the network function is requested from a neighboring layer-two fog node until the network function is found. The requested network function is executed once it is found.

The layer-three fog node can include cached copies of popular network functions or network functions that are most requested.

The neighboring layer-two fog node can be the next closest layer-two fog node or a direct neighbor layer-two fog node.

Another embodiment is a caching method in a F-RAN based mmWave communication system that includes receiving a request for a network function generated from a requesting mobile station at a fog node closest to the requesting mobile station; and requesting a network function from the fog node. If the requested network function is not supported at the fog node, the network function is requested from a neighboring fog node. The requested network function is executed once it is found.

The fog node can include cached copies of popular network functions or cached copies of network functions that are most requested.

The neighboring fog node can be the next closest fog node or a direct neighbor fog node.

These and other features of the present subject matter will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
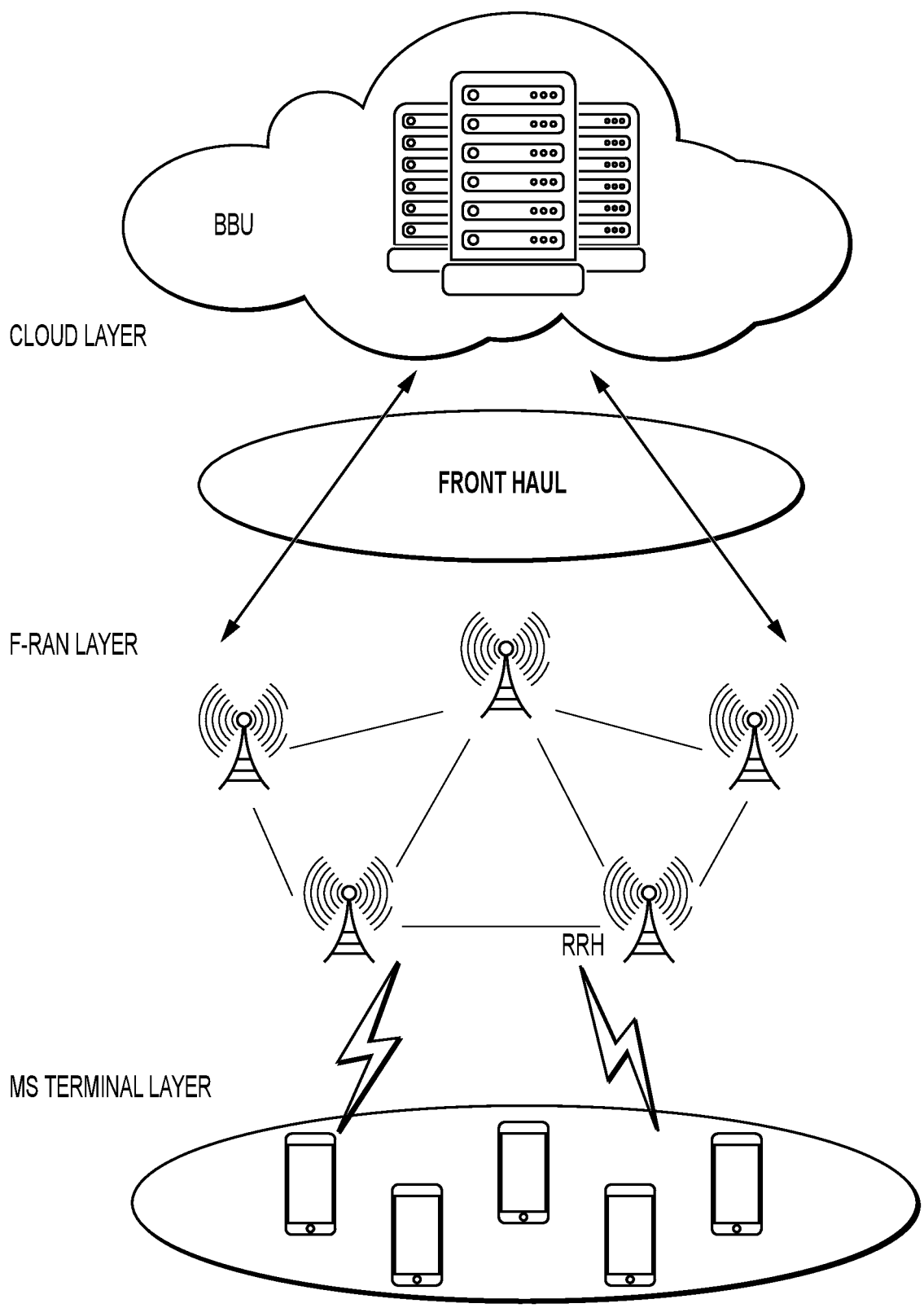
FIG. 1 is a schematic diagram showing a basic multi-layer F-RAN architecture for mmWave NR (New Radio) operations.

Millimeter wave (mmWave) bands support wide bandwidth transmission without the need for sophisticated channelization techniques, such as multi-carrier and career aggregation. This is attributed to the wide contiguous bandwidth chunks at these bands. This has allowed for mmWave to be considered in the New Radio (NR) standard of 5G standard, in the Frequency Range (FR) 2. A key limitation in mmWave bands here is the high path and penetration losses, along with atmospheric attenuation, oxygen absorption, and sensitivity to blockage. This makes mmWave links susceptible to significant degradation in signal quality.

The long separation distances between mobile station (MS) terminals and access points (radio remote heads) adds complexity to the design of beamforming and access networks. For beamforming, new designs are required that deem low power consumption and multianalog beamformers at the MS terminals and digital or hybrid beamformers at the BS for spatial multiplexing and multi-user connectivity. For access networks, it is essential to reduce fronthaul traffic to minimize end-to-end delays for the geographically distributed terminals. Conventional solutions here include cloud-radio access networks (C-RANs) that allow for a centralized baseband unit (BBU) pool that processes various network functions (NFs). These NFs are migrated from the radio remote heads (RRHs) that feature limited resources to the C-RAN through fronthaul links, i.e., to benefit from the abundant resources at the cloud core. The C-RAN (BBU) here facilitates centralized scheduling and allocation at the RRHs.

One limitation to this centralization structure is the need to collect information from the distributed RRHs, which increases signaling over the fronthaul links. This, in turn, prolongs the propagation delay for service requests, in addition to an increase in power consumption and cost for the network.

An alternative structure is the deployment of F-RAN at the edge of the network, which is more suitable for mmWave operations, as it reduces the separation distances between MS terminals and RRHs. The closer proximity to the MS terminals also reduces power consumption, which promotes power efficiency for mmWave communications.

Therefore, it is important to reduce the fronthaul traffic and deploy NFs at the edge to provide low latency services. The caching method for F-RAN based communications caches the popular NFs requested by incoming traffic at fog nodes that are collocated with the RRH. This forms a F-RAN that offers existing copies of the NFs with less processing and storage demands. This eliminates online offloading between the cloud and fog nodes, and instead allows for offline prefetching from the cached content of the popular NFs. As a result, network operators benefit from a reduction in the transmitted power and the fronthaul cost. Furthermore, caching at the fog nodes promotes network densification of mmWave small cells, given the efficient resource utilization that allows for higher network capacity. Overall, it is beneficial to enable fog nodes with new functionalities, such as virtualization and efficient caching for robust mmWave backhaul networks, which allows for flexible and agile operations. A further consideration is to implement novel resource allocation and node placement in mmWave F-RAN for content-caching of popular NFs at the edge of the fog nodes. Determining the best fog node that allows for the largest content caching, along with reduced delay and cost, will be very beneficial.

In clustered caching, all the popular NFs are collectively cached onto a single node at an upper fog layer that has more resources than lower layers. In distributed caching, a single popular NF is separately cached across every node, i.e., each fog node caches one NF, the NFs being different on each node. The interconnection between the nodes yields in the total cached NFs, where each host fog node is directly connected to an adjacent node that caches other popular NFs. Incoming requests are routed to interconnected nodes that host the cached NFs. The distribution mechanism avoids increased traffic directed toward a single node and link, i.e., to avoid node/link congestion and failure.

FIG. 1 is an illustration of a basic multi-layer F-RAN architecture for mmWave NR operations. It includes MS terminals, fog nodes in cluster distribution, and a cloud layer.

The MS Terminals (Layer I) are user terminals that demand various services (network functions) of different delay and capacity specifications. Terminals can be mobile stations, sensors, vehicles, desktops, laptops, etc., which are distributed across the fog nodes in each cluster, i.e., each cluster is comprised of multiple fog nodes.

Primary Nodes in Fog-RAN (Layer II) includes distributed, homogenous fog nodes that are collocated with RRHs at the proximity of MS terminals in Layer I and cloud-RAN in Layer IV. They are equipped with beamforming architectures to provide high bandwidth links with the MS s. It is the gateway at the edge of the network that receives traffic requests, and thus provides services at stringent delay bounds and limited resources.

Secondary Nodes in Fog-RAN (Layer III) are another set of fog nodes that possess higher resources as compared to the primary nodes, albeit less resources than the cloud core. Every secondary node manages a cluster of primary nodes through direct links. This intermediate structure combines the benefits of Layers II and IV, i.e., higher resources at the expense of a slight increase in fronthaul delays.

The Cloud-RAN layer (Layer IV) is comprised of widely dispersed cloud nodes that possess abundant resources. It acts as the network BBU and contains the NFs that are offloaded to the fog nodes via wireless fronthaul links that operate on microwave sub 6 GHz.

Figure 2:
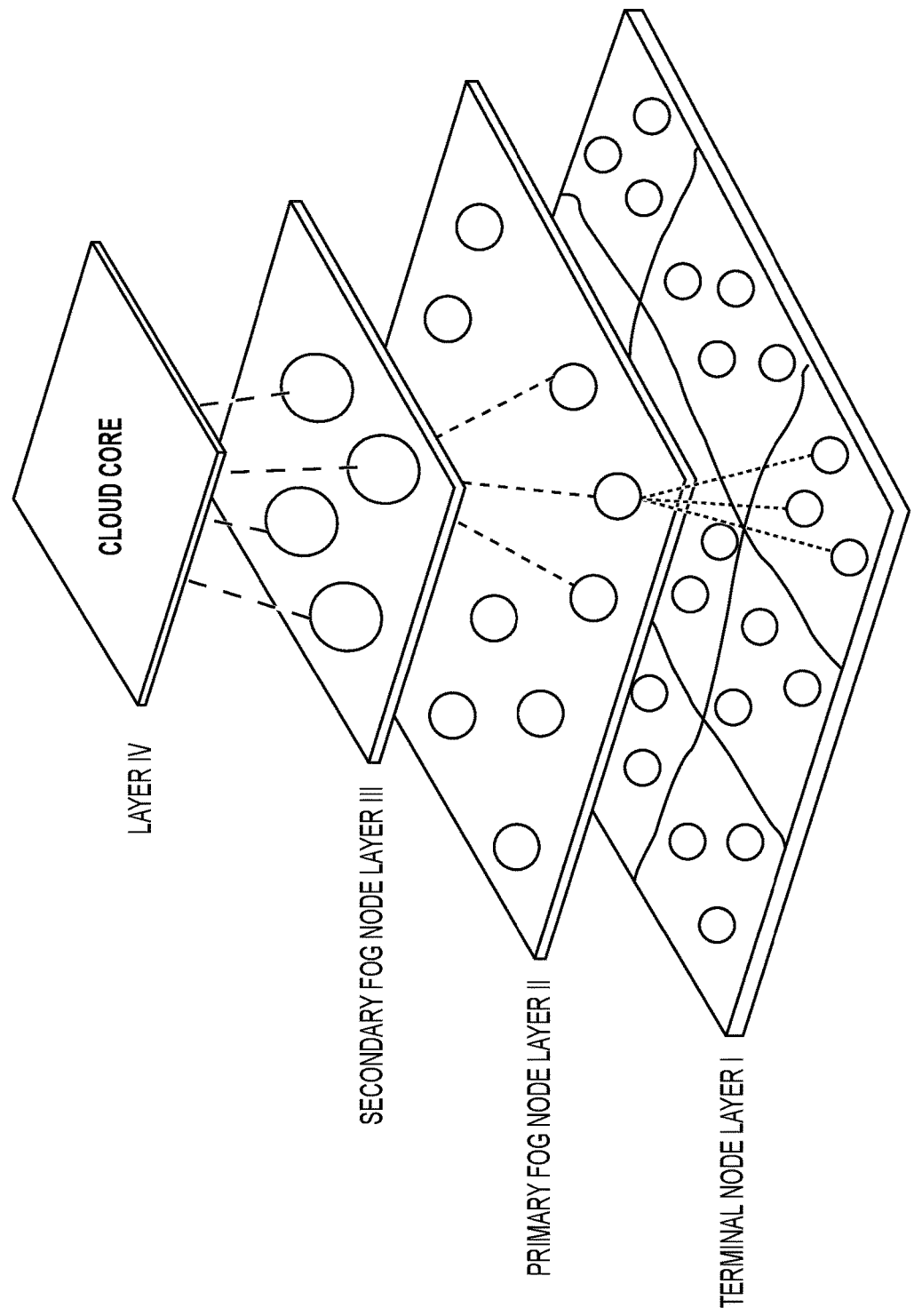
FIG. 2 is a schematic diagram of a multi-layer F-RAN architecture for mmWave NR operation, showing a more detailed depiction of the layers in the network.

FIG. 2 is a detailed illustration of a multi-layer F-RAN architecture for mmWave NR operation. There are four layers in the architecture that are organized hierarchically. The lowest one (Layer I) is the set of all end-user terminals, which are devices that request service from the users. These terminals first communicate with the network gateway, which are (small) primary fog nodes in close proximity to the terminals. These fog nodes have the shortest geographical separation distances to the terminals. These fog nodes are distributed widely to cover more areas and serve more terminals. They are termed as Layer II in the architecture. This layer includes adjacent clusters of fog nodes that all have the same processing capacity and speeds. Then Layer II (each cluster in the layer) is administered and controlled by (larger) Secondary Fog Nodes in Layer III, termed as cluster heads that have more capacity for resources. Nodes in Fog Layer III are farther from the terminals, and they are the backbone of Layer II. Terminals do not have direct access to Fog nodes to Layer III. They have to initially go through Layer II. Lastly, the Secondary Nodes (Layer III) are connected to the last tier, which is the cloud core in Layer IV.

A cached model places NFs at the edge of a network in the F-RAN without offloading to the cloud BBU. However, given the limited available resources of F-RAN, efficient cache placement methods are proposed for the fog nodes.

Two schemes are used to distribute cached content across the fog nodes, namely, clustered caching and distributed caching methods. In clustered caching, all the popular NFs are cached across a single fog node in Layer III, given the abundant resources across the secondary fog nodes. Meanwhile, the distributed caching method allocates a single popular NF across every node in each cluster. The interconnection between the cluster nodes yields in the total cached NFs, where each host fog node is directly connected to an adjacent node that caches another popular NF.

In clustered caching, an incoming request (r) generated from an MS terminal (m), requests an Fr set of NFs. This request is received at the src node, which is the closest fog node to the terminal. The traffic traverses to Layer III, which contains the cached NFs. If any of the NFs is not supported at the node, then mapping is conducted across the direct neighbor in Layer II, which is in the direction of the path toward the src node.

In distributed caching, popular NFs are cached separately across the fog nodes of each cluster. Then, incoming requests are routed to the sequence of interconnected nodes that host the entire cached NFs. The rationale behind this distribution mechanism is to avoid increased traffic directed toward a single node and link, i.e., in effort to avoid node/link congestion and failure. Accordingly, a single popular NF is cached on each host node in Layer II. The result is a set of interconnected nodes and links that form a cached path that all incoming requests are routed across. When an incoming request for an NF is received, the request is mapped to the first node in the path closest to the MS terminal (m).

Figure 3:
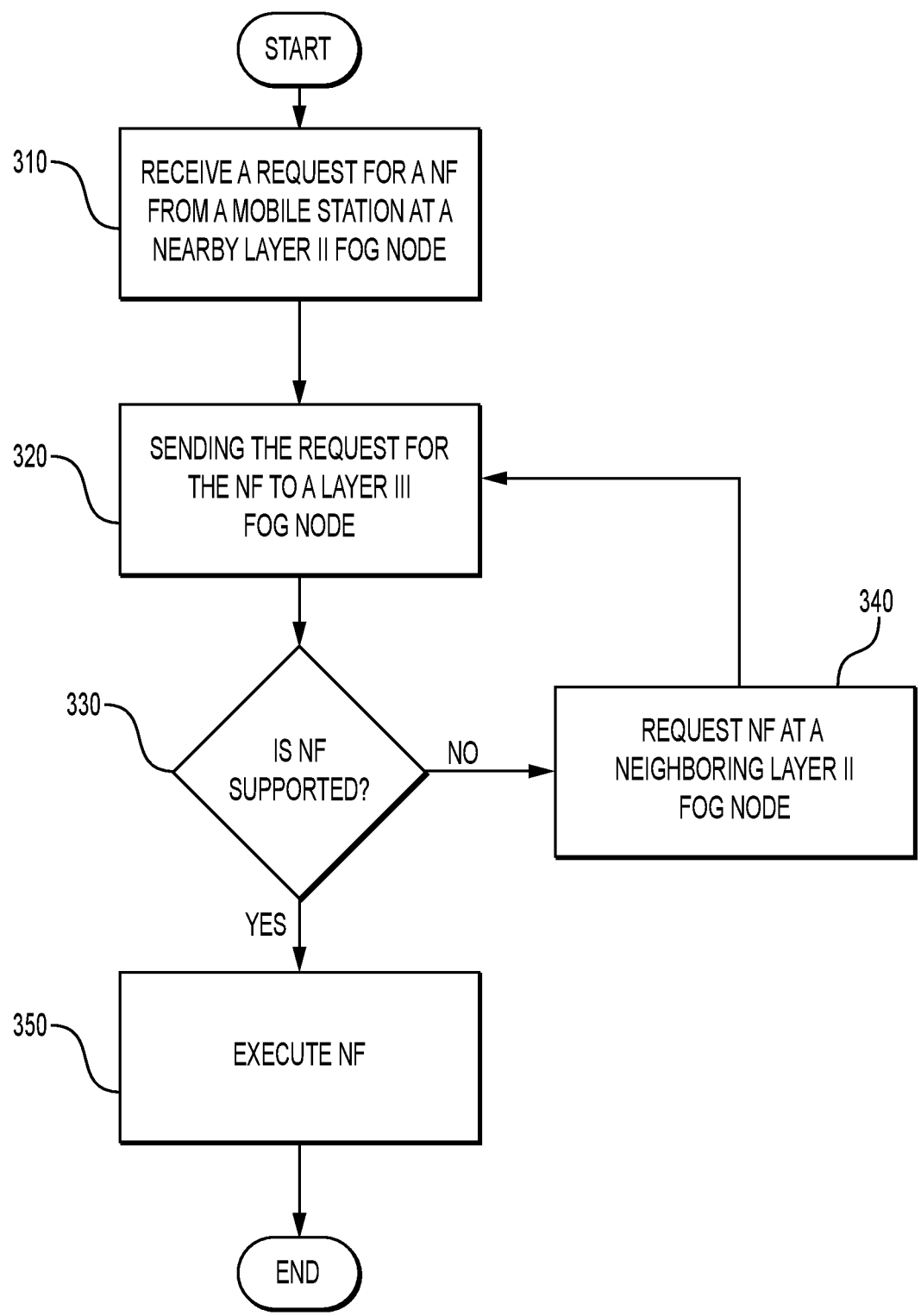
FIG. 3 is flowchart of a clustered caching method in a F-RAN based mmWave communication system.

FIG. 3 is a flowchart of a clustered caching method in a F-RAN based mmWave communication system. In step 310, a request is received for a network function generated from a requesting mobile station at a layer-two fog node closest to the requesting mobile station. In step 320, the request for a network function is sent from the layer-two fog node to a layer-three fog node. In step 330, if the requested network function is not supported at the layer-three fog node, the network function is requested at a neighboring layer-two fog node (340). Finally in step 350, the requested network function is executed.

Figure 4:
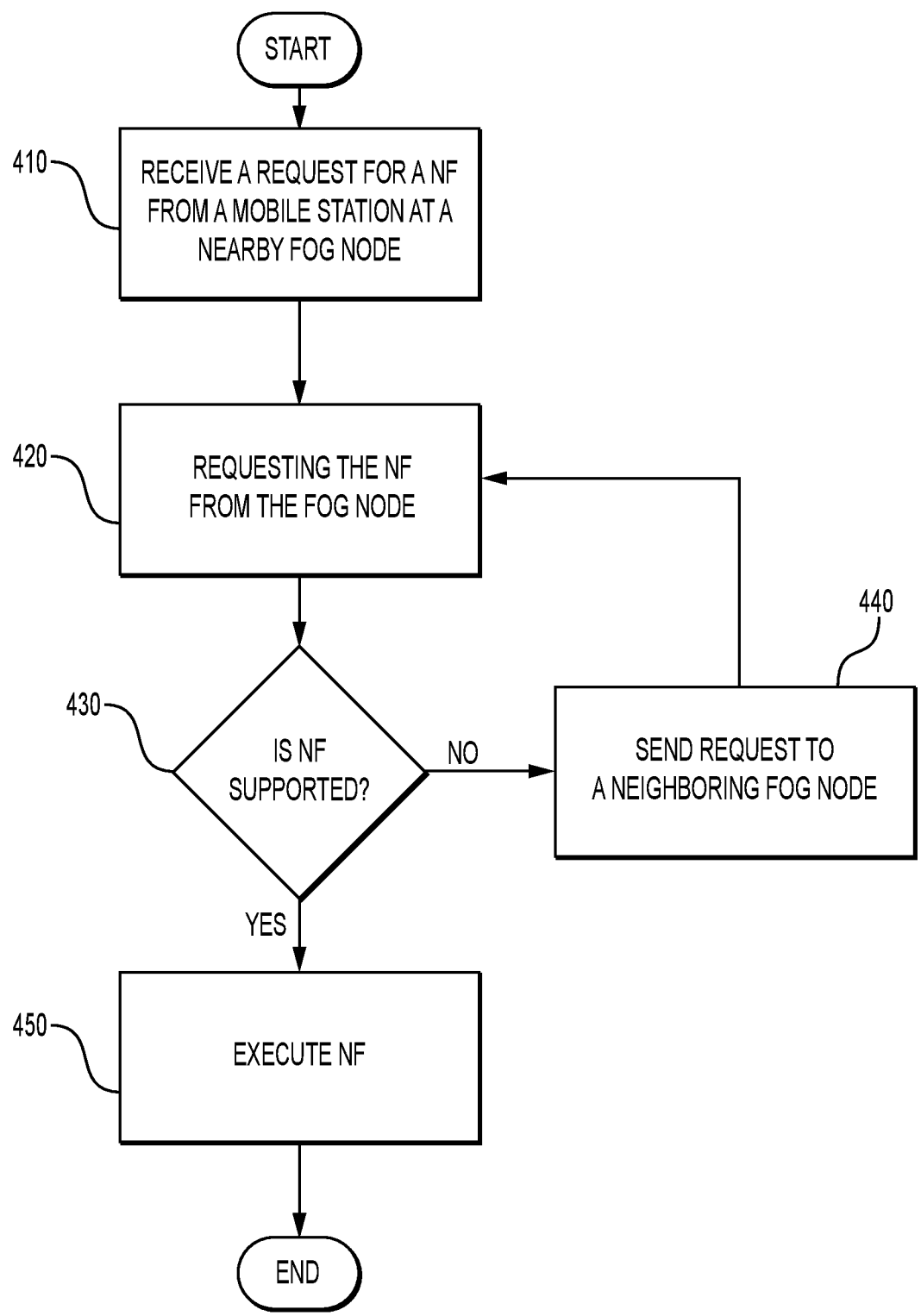
FIG. 4 is a flowchart of a distributed caching method in a F-RAN based mmWave communication system.

FIG. 4 is a flowchart of a distributed caching method in a F-RAN based mmWave communication system. In step 410, a request is received for a network function generated from a requesting mobile station at a layer-two fog node closest to the requesting mobile station. In step 420, the network function is requested from the layer-two fog node. In step 430, if the requested network function is not supported at the layer-two fog node, the network function is requested from a neighboring layer-two fog node (step 440). Finally in step 450, the requested network function is executed.

Our tests show that the clustered caching method minimizes the total time required for service provisioning, as compared to the distributed method. Meanwhile, the latter achieves a slight reduction in network cost and energy. Overall, this supports a tradeoff based on network preference, i.e., the priority metric selected for operation.

It is to be understood that the caching method for F-RAN based communications is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A caching method for F-RAN based communications in a mmWave network having a hierarchy of layers including a plurality of mobile stations in layer-one requesting services requiring execution of network functions, a plurality of fog nodes in layer-two distributed in range of the mobile stations for receiving the requests from the mobile stations, a plurality of cluster fog nodes having selected network functions cached thereon in layer-three for receiving and servicing requests for network functions forwarded by layer-two fog nodes, and a plurality of cloud nodes in layer-four storing all network functions, the method comprising the steps of:
    receiving a request for a network function generated from a requesting mobile station at a layer-two fog node closest to the requesting mobile station;
    sending the request for a network function from the layer-two fog node to a layer-three fog node;
    if the requested network function is not hosted at the layer-three fog node, requesting the network function from a neighboring layer-two fog node; and
    executing the requested network function at the layer-three cluster node when the requested network function is among the selected network functions cached on the layer-three cluster node without contacting a layer-four cloud node,
    wherein each of the layer-three fog nodes is assigned to service requests for network functions from a cluster of layer-two fog nodes within direct communication range of the layer-three cluster fog node.

2. The caching method as recited in claim 1, further comprising the step of the layer-four cloud nodes caching the selected network functions on the layer-three cluster fog nodes prior to requests for the network functions being received.

3. The caching method as recited in claim 1, wherein the neighboring layer-two fog node is a layer-two fog node closest to the layer-two fog node receiving the request from the layer-one mobile station.

4. The caching method as recited in claim 1, wherein the neighboring layer-two fog node is a direct neighbor layer-two fog node.

* * * * *